Feb. 2, 1926.
E. SANDERS
POTATO HARVESTER
Filed Oct. 27, 1924
1,571,344
3 Sheets-Sheet 3
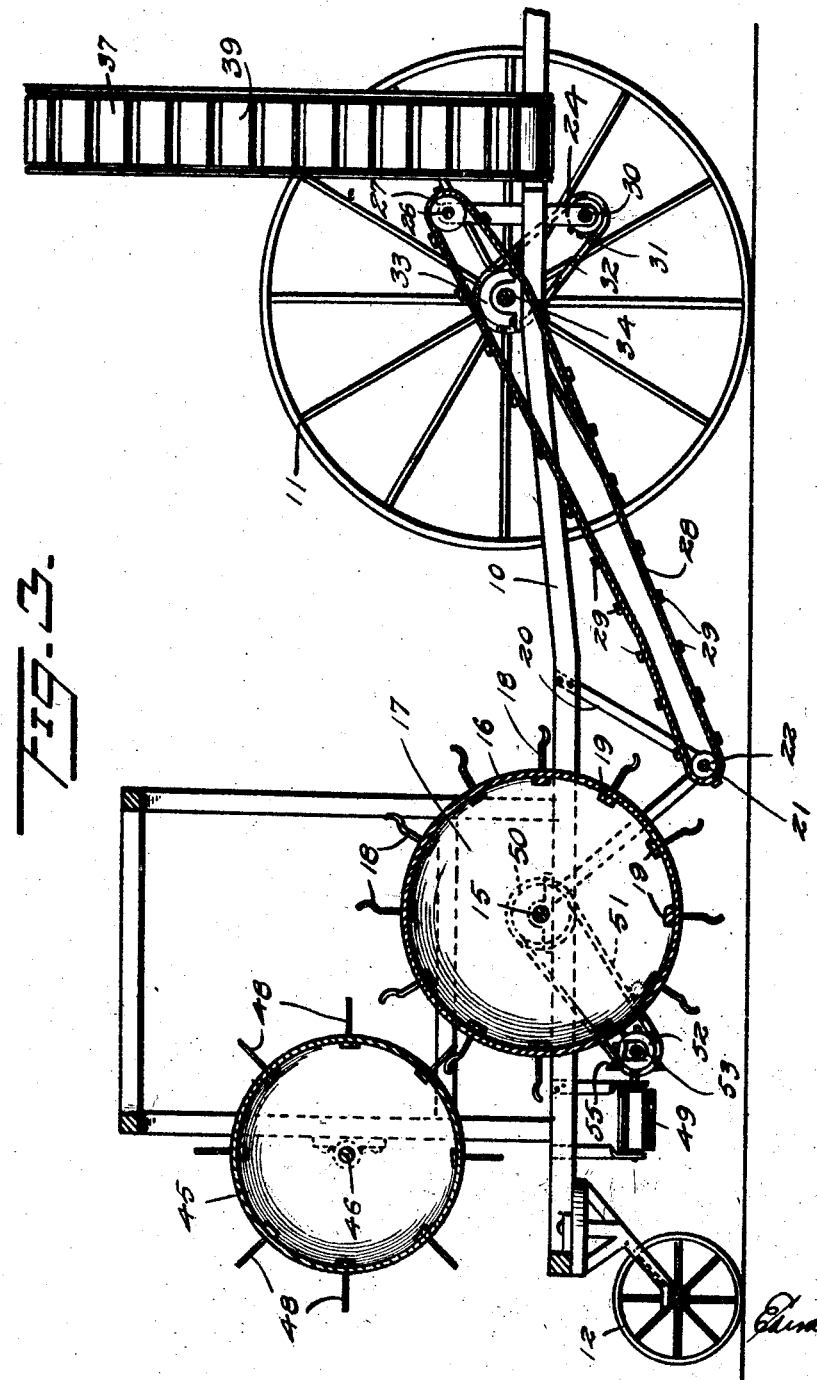

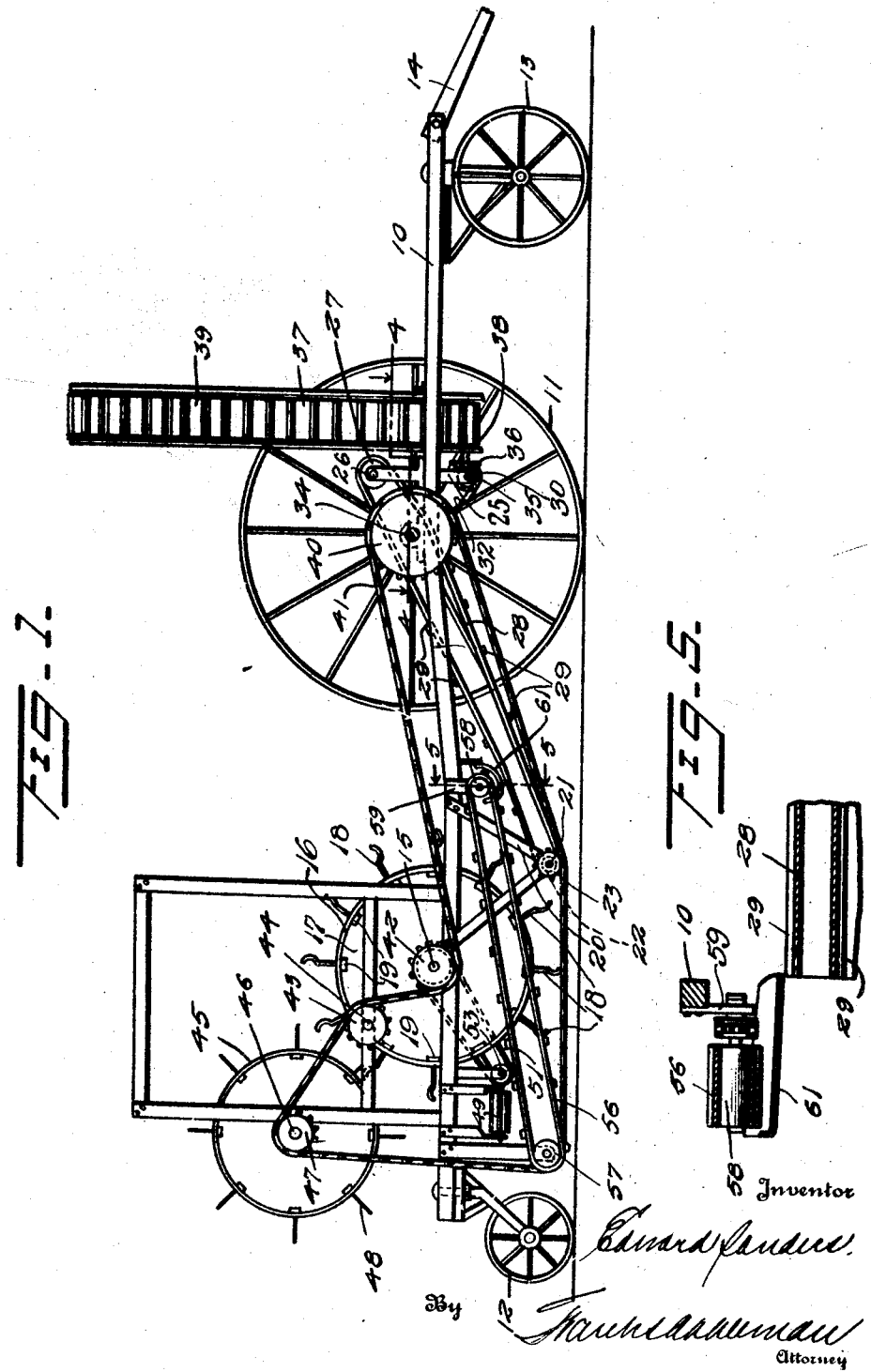

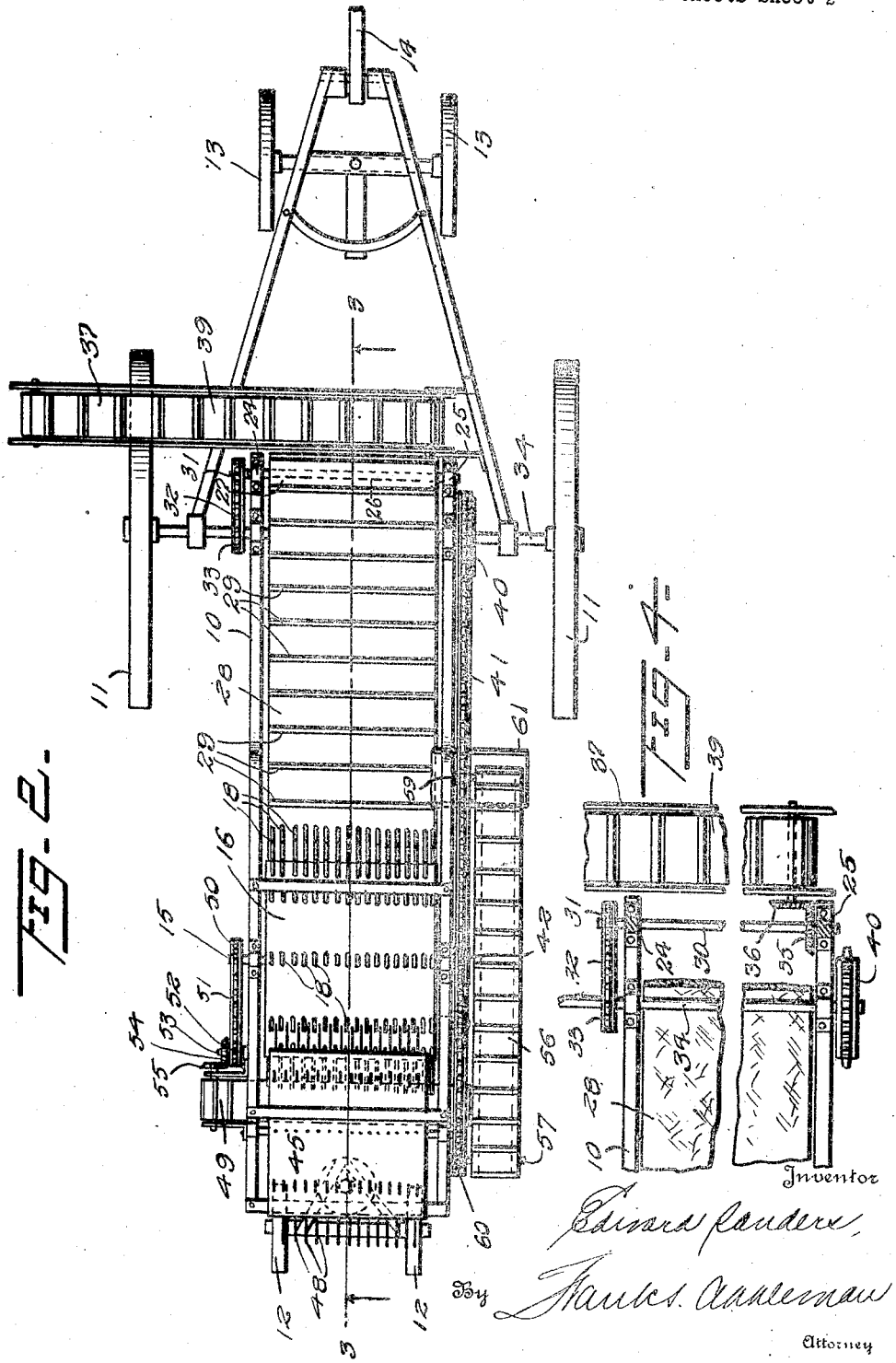

Patented Feb. 2, 1926.

1,571,344

UNITED STATES PATENT OFFICE.

EDWARD SANDERS, OF MOORHEAD, MINNESOTA.

POTATO HARVESTER.

Application filed October 27, 1924. Serial No. 746,172.

*To all whom it may concern:*

Be it known that I, EDWARD SANDERS, a citizen of the United States of America, and resident of Moorhead, in the county of Clay and State of Minnesota, have invented certain new and useful Improvements in Potato Harvesters, of which the following is a specification.

This invention relates to potato harvesters, and has for an object the provision of novel means for collecting potatoes that have been dug and distributed on the soil, or that are slightly imbedded in the soil as the potato digging machine leaves them when it has passed over land in which potatoes have grown.

It is an object of this invention to produce a machine capable of dislodging potatoes from the ground and directing them to a conveyer where they are elevated longitudinally of the harvester and delivered to a transversely operable conveyer for directing or delivering the potatoes to a wagon or receptacle at the side of the said harvester.

It is a further object of this invention to produce novel means for maintaining the potato dislodging elements in condition to operate satisfactorily and expeditiously, and to that end, means are provided for displacing clods or accumulations of soil which may adhere to the potato dislodging elements.

It is a still further object of this invention to supply a supplemental transversely operable conveyer adapted to receive potatoes that may have been carried by the potato dislodging elements past the first mentioned conveyer, which potatoes may be removed from the potato dislodging members while the accumulated clods or earth are being removed; and it is a further object of the invention to provide a supplemental longitudinally operable conveyer for receiving potatoes from the second mentioned transversely operable conveyer and to supply means by which the potatoes on the last mentioned longitudinally operable conveyer shall be delivered to the first mentioned longitudinally operable conveyer. By reason of the association of parts just described, it will be apparent that the initial operation of the potato dislodging members will serve to deliver the potatoes to the first mentioned conveyer, and that only in case of the potatoes being carried by the dislodging elements beyond a predetermined point in their travel will the supplemental conveyer be of utility.

It is a still further object of this invention to provide novel and inexpensive means for driving all of the conveyers, as well as the potato dislodging members in unison and from a source of power derived from traction wheels of the apparatus.

It is a still further object of this invention to interpose novel power transmitting means for accomplishing the result indicated.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a potato harvester embodying the invention;

Figure 2 illustrates a top plan view thereof;

Figure 3 illustrates a longitudinal sectional view of the said harvester on the line 3—3 of Fig. 2;

Figure 4 illustrates a plan view of fragments of two of the conveyers and the power transmitting means associated with them; and Figure 5 illustrates an enlarged sectional view on the line 5—5 of Fig. 1, omitting the driving chain.

In these drawings, I have illustrated a conventional form of wheel-supported frame 10 of a size and dimensions to support the operating mechanism, and as this frame may be changed in size and proportions to suit particular requirements, it is believed unnecessary to describe the same more fully. The frame is supported by traction wheels 11 and by guide or caster wheels 12 and 13 of the types ordinarily used on farm implements and the like, and any suitable hitch, conventionally shown at 14, may be employed for drawing the harvester.

A shaft 15 is appropriately journaled on the frame and it supports a potato dislodging device which may rotate in performing its function. In the present embodiment of the invention, this potato dislodging device comprises a cylinder 16 connected by heads such as 17 to the shaft, and the said cylinder has a plurality of curved fingers 18 secured to it, which fingers are intended to imbed themselves in the soil to an extent which will enable them to dislodge potatoes which are resting on the surface of the soil, or which are slightly imbedded therein. The shanks of the fingers may extend through the cylinder and they may be anchored in plates 19 within the cylinder, but these fingers may be secured to the cylinder in any appropriate way. The fingers are spaced apart from one another and are preferably arranged in rows longitudinally and circumferentially of the cylinder.

Brackets 20 depend from the frame, preferably on each side of the machine, and these brackets have bearings in which a shaft 21 of a drum 22 or the like is journaled, and the said shaft has a sprocket wheel 23 secured to it, preferably at one of its ends, which project beyond the side of the frame of the harvester. Standards 24 and 25 are secured to the sides of the frame and a shaft 26 is journaled in the said standards at their upper ends. A drum 27 is carried by the shaft 26, and the said drums 22 and 27 have a conveyer belt 28 operating around them, the said conveyer belt having appropriate potato engaging cleats or slats 29 that serve to cause the potatoes to be carried by the belt after the potatoes have been deposited thereon by the potato dislodging fingers heretofore described.

A shaft 30 is journaled in the lower ends of the standards 24 and 25, and the said shaft has a sprocket wheel 31 secured on it which is engaged by a sprocket chain 32 operating over a sprocket wheel 33 of the shaft 34 on which the traction wheels 11 are mounted, so that the said traction wheels drive the shaft 30 as the harvester is moved. The shaft 30 is further provided with a gear wheel 35 which meshes with a gear wheel 36 of the lateral conveyer 37. The gear wheel 36 is mounted on a shaft 38 and the shaft 38 operates the conveyer belt or web 39, and therefore, the potatoes that have been carried by the conveyer belt 28 will be delivered to the lateral conveyer 37 and carried clear of the side of the harvester. The shaft 34 is also provided with a sprocket wheel 40 for a drive chain 41 which is utilized to convey motion to a plurality of shafts, as will presently appear.

The shaft 15 of the drum has a gear wheel 42 secured to it which is engaged by the sprocket chain 41, and an idling sprocket wheel 43 is rotatable on a stub shaft 44 for the purpose of guiding the sprocket chain 41 to the cleaning device which dislodges clods of potatoes from the potato dislodging device.

The finger cleaning means of the present embodiment of the invention comprise a cylinder 45 mounted on a shaft 46 which is rotatably mounted in suitable bearings of the frame, and the said shaft 46 has a sprocket wheel 47 run by the sprocket chain 41. Cleaning pins or elements 48 are carried by the cylinder and they may be in such number and so arranged as to travel between the fingers 18 to dislodge clods or packed earth from between the said fingers.

A transversely disposed conveyer 49 is supported below the cleaning device and just to the rear of the path of travel of the potato dislodging fingers. The transversely disposed conveyer is driven through means of a sprocket wheel 50 on the shaft 15, a sprocket chain 51, a sprocket wheel 52 on the shaft 53 and gear wheels 54 and 55 which mesh to drive the said conveyer, as will be understood by those skilled in the art. The transversely disposed conveyer 49 is of the same general construction as the conveyer 37, except it may be of smaller size. The driving elements of the conveyer are so arranged as to move the upper course of the conveyer toward the second longitudinally operable conveyer 56, the last mentioned conveyer being mounted on drums or rotatable elements 57 and 58, the latter of which is journaled in brackets such as 59. A sprocket wheel 60 on the shaft 57 is engaged by the sprocket chain 41 so that the sprocket chain 41 engages the sprocket wheels 40, 42, 43, 47, 60 and 23, driving them all in unison as the traction wheels are rotated.

The conveyer 56 discharges at its forward end into a transversely disposed chute or spout 61 which is inclined inwardly so that potatoes carried by the said conveyer 56 and delivered to the spout or chute 61 will be directed to the conveyer to which potatoes are delivered by the potato dislodging fingers.

It will be apparent from an inspection of the drawing and from the foregoing description that when potatoes are dislodged by the fingers and delivered to the first conveyer, they will find their way to the lateral conveyer first described and that this simple operation will result in delivering most of the potatoes clear of the harvester. However, under certain conditions, as when the soil is wet and sticky, a few potatoes will be carried by the fingers around the drum until they are dislodged by the cleaning pins. Such dislodged potatoes would then fall into the lateral conveyer 49 and be carried thereby to the conveyer 56, which, in turn, will deliver them to the chute and then to the first mentioned conveyer, by which they will be carried to the first described lateral conveyer and deposited at the side of the harvester.

The provision for driving the mechanism by a chain from the traction wheels results in a simplified construction and an efficient device for the purpose intended.

I claim:

1. In a potato harvester, a traction wheel supported frame, a member rotatably mounted on the frame, potato displacing fingers carried by the said member, a member rotatable in operative relation to the fingers, elements on the second mentioned member projecting into the path of travel of the fingers for dislodging material from between the fingers, a transversely operable conveyer rearwardly of the first mentioned element for receiving potatoes displaced from the fingers, a longitudinally operable conveyer for receiving potatoes from the first mentioned conveyer, a longitudinally operable conveyer in front of the potato dislodging means in position to receive the dislodged potatoes, a transversely operable conveyer at the front of the second mentioned longitudinally operable conveyer, means for driving the aforesaid elements in unison from the traction wheels, and a chute for delivering potatoes from the first mentioned longitudinal conveyer to the second mentioned longitudinal conveyer.

2. In a potato harvester, a frame, traction wheels for supporting the frame, standards secured to the sides of the frame near the front thereof, shafts journaled in the ends of said standards, a sprocket chain for communicating motion of the traction wheels to the shaft on the lower end of the standards, a transversely operable conveyer at the front of the said standards, means for communicating the motion of the last mentioned shaft to the said conveyer, a longitudinally operable conveyer for delivering potatoes to the first mentioned conveyer, potato dislodging means rotatably supported on the frame at the rear of the second mentioned conveyer for delivering potatoes to the said conveyer, means for dislodging deposits from the potato dislodging means, a conveyer at the rear of the potato dislodging means for receiving potatoes removed from the potato dislodging means, a longitudinally operable conveyer for receiving potatoes from the last mentioned conveyer, a chute from the last mentioned longitudinally operable conveyer to the second mentioned conveyer, and means for driving the aforesaid parts in unison through power from the traction wheels.

3. In a potato harvester, a rotatably mounted drum, fingers radiating therefrom adapted to dislodge potatoes from soil, a transversely operable conveyer at the rear of the drum, a rotatably mounted element substantially over the said conveyer, means radiating from the said element for removing deposits from the fingers, a longitudinally operable conveyer for receiving potatoes from the first mentioned conveyer, a conveyer to which potatoes are delivered by the dislodging fingers, a chute leading from the second mentioned conveyer to the last mentioned conveyer whereby potatoes are delivered thereto, a transversely operable conveyer to which potatoes are delivered from the conveyer receiving potatoes from the dislodging fingers, and gearing connected to the traction wheels whereby the aforesaid mechanism is driven from the traction wheels.

EDWARD SANDERS.